(12) United States Patent
Brown et al.

(10) Patent No.: US 8,103,810 B2
(45) Date of Patent: Jan. 24, 2012

(54) NATIVE AND NON-NATIVE I/O VIRTUALIZATION IN A SINGLE ADAPTER

(75) Inventors: Aaron C. Brown, Austin, TX (US); Douglas M. Freimuth, New York, NY (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/114,970

(22) Filed: May 5, 2008

(65) Prior Publication Data

US 2009/0276551 A1 Nov. 5, 2009

(51) Int. Cl.
- G06F 13/12 (2006.01)
- G06F 13/38 (2006.01)
- G06F 13/00 (2006.01)

(52) U.S. Cl. ............... 710/62; 710/104; 710/316
(58) Field of Classification Search .......... None
See application file for complete search history.

(56) References Cited

U.S. PATENT DOCUMENTS

| | | | |
|---|---|---|---|
| 6,684,281 B1 | 1/2004 | Sugahara et al. | |
| 7,308,523 B1 | 12/2007 | Ngai | |
| 2004/0019729 A1 | 1/2004 | Kelley et al. | |
| 2005/0129040 A1* | 6/2005 | Kiel et al. | 370/412 |
| 2006/0161419 A1 | 7/2006 | Herrell et al. | |
| 2006/0277348 A1 | 12/2006 | Wooten | |
| 2007/0300241 A1* | 12/2007 | Prakash et al. | 719/321 |
| 2008/0005706 A1 | 1/2008 | Sharma et al. | |
| 2008/0034147 A1 | 2/2008 | Stubbs et al. | |
| 2008/0162800 A1* | 7/2008 | Takashige et al. | 711/104 |

OTHER PUBLICATIONS

Intel Technology Journal, "Inter Virtualization Technology for Directed I/O", vol. 10, Issue 03, Published Aug. 10, 2006, pp. 179-192.*
Mellanox Technologies, "White Paper: I/O Virtualization Using Mellanox InfiniBand and Channel I/O Virtualization (CIOV Technology)", 2007, pp. 1-16.*
U.S. Appl. No. 11/612,543, filed Dec. 19, 2006, Freimuth et al.
U.S. Appl. No. 11/612,522, filed Dec. 19, 2006, Freimuth et al.
U.S. Appl. No. 11/612,526, filed Dec. 19, 2006, Freimuth et al.
U.S. Appl. No. 11/612,530, filed Dec. 19, 2006, Freimuth et al.
U.S. Appl. No. 11/612,535, filed Dec. 19, 2006, Freimuth et al.
U.S. Appl. No. 11/612,538, filed Dec. 19, 2006, Freimuth et al.
U.S. Appl. No. 11/612,547, filed Dec. 19, 2006, Freimuth et al.
U.S. Appl. No. 11/612,555, filed Dec. 19, 2006, Freimuth et al.
U.S. Appl. No. 11/612,562, filed Dec. 19, 2006, Freimuth et al.

* cited by examiner

Primary Examiner — Tariq Hafiz
Assistant Examiner — Dayton Lewis-Taylor
(74) Attorney, Agent, or Firm — Stephen J. Walder, Jr.; Matthew B. Talpis

(57) ABSTRACT

Mechanisms for enabling both native and non-native input/output virtualization (IOV) in a single I/O adapter are provided. The mechanisms allow a system with a large number of logical partitions (LPARs) and system images to use IOV to share a native IOV enabled I/O adapter or endpoint that does not implement the necessary number of virtual functions (VFs) for each LPAR and system image. A number of VFs supported by the I/O adapter, less one, are assigned to LPARs and system images so that they may make use of native IOV using these VFs. The remaining VF is associated with a virtual intermediary (VI) which handles non-native IOV of the I/O adapter. Any remaining LPARs and system images share the I/O adapter using the non-native IOV via the VI. Thus, any number of LPARs and system images may share the same I/O adapter or endpoint.

25 Claims, 11 Drawing Sheets

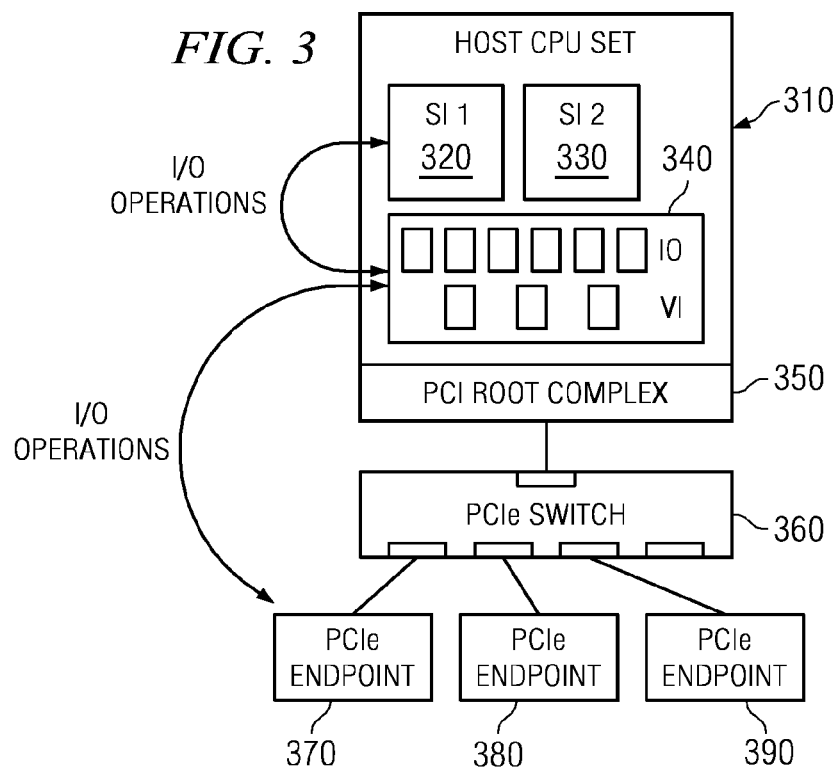
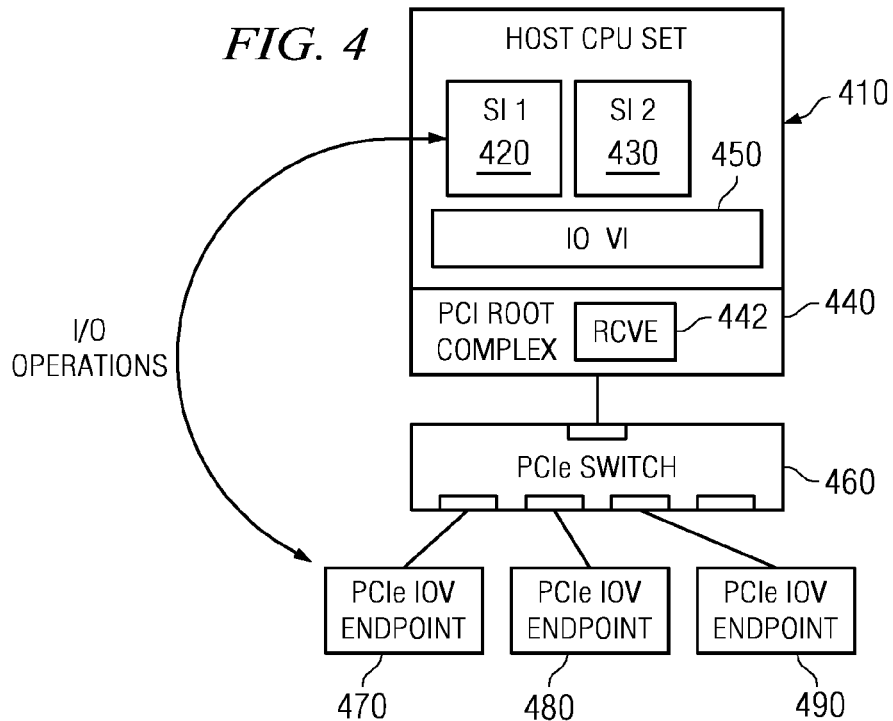

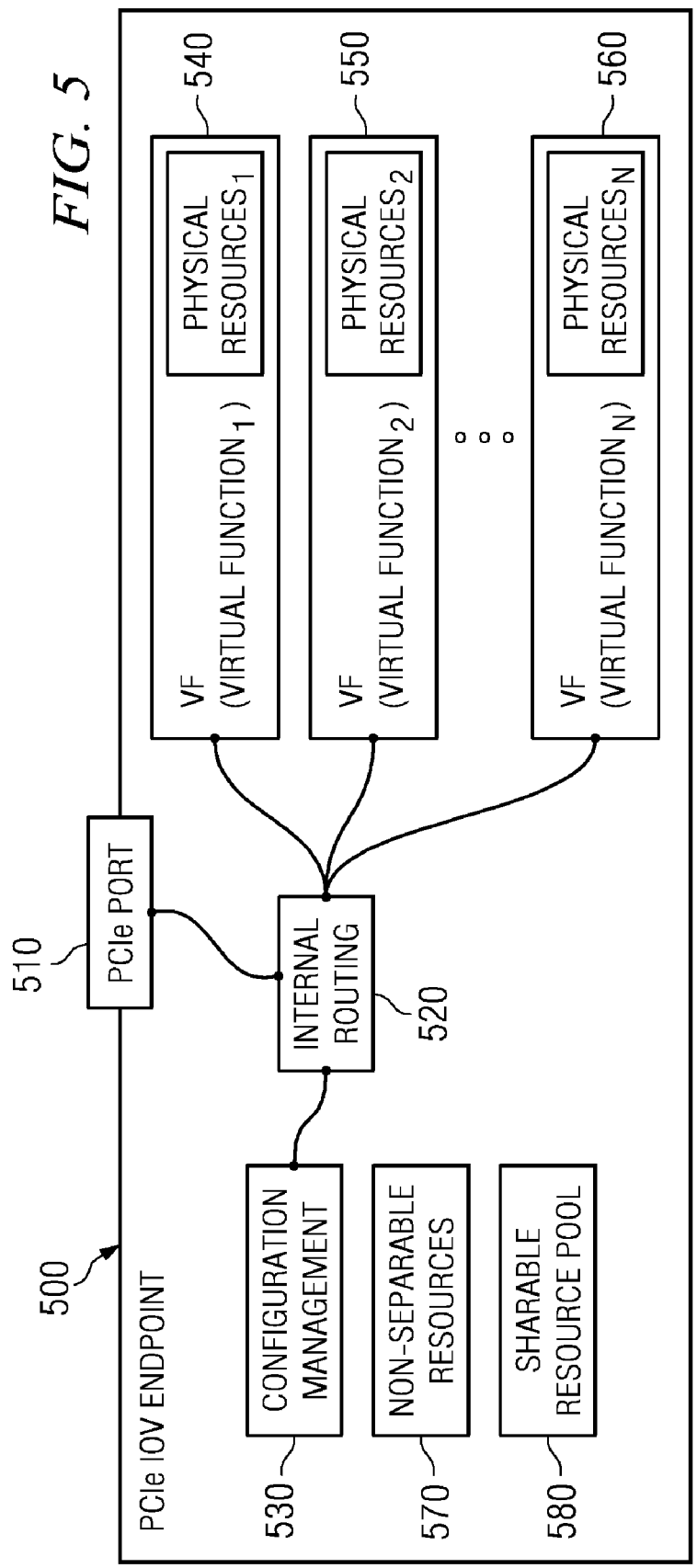

NATIVE AND NON-NATIVE I/O VIRTUALIZATION IN A SINGLE ADAPTER

BACKGROUND OF THE INVENTION

1. Field of the Invention

The present invention relates generally to an improved data processing system and method. More specifically, the present invention is directed to a system and method for enabling native and non-native input/output virtualization (IOV) in a single input/output (I/O) adapter or endpoint.

2. Background of the Invention

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a system incorporating a PCI Express (PCIe) fabric topology in accordance with the PCIe specification. As shown in FIG. 1, the system 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 140, 170 and 182-188. For more information regarding PCI and PCIe, reference is made to the PCI and PCIe specifications available from the peripheral component interconnect special interest group (PCI-SIG) website at www.pcisig.com.

In addition to the PCI and PCIe specifications, the PCI-SIG has also defined input/output virtualization (IOV) standards for defining how to design an I/O adapter (IOA) which can be shared by several logical partitions (LPARs) and thus, several system images, through a virtual intermediary (VI), such as a virtual I/O server (VIOS) partition, or the like. A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

BRIEF SUMMARY OF THE INVENTION

In one illustrative embodiment, a method, in a data processing system, for performing input/output (I/O) operations between a host system and an I/O adapter is provided. The method may comprise creating a plurality of virtual functions (VFs) in an I/O adapter of the data processing system. The method may further comprise configuring at least one first VF to support non-native I/O virtualization (IOV) in the I/O adapter. Moreover, the method may comprise configuring at least one second VF to support native IOV in the I/O adapter. The method may also comprise performing I/O operations between a host system of the data processing system and the I/O adapter utilizing native IOV and the at least one second VF. In addition, the method may comprise performing I/O operations between the host system and the I/O adapter utilizing non-native IOV and the at least one first VF.

In another illustrative embodiment, a computer program product comprising a computer useable medium having a computer readable program stored thereon is provided. The computer readable program, when executed on a computing device, causes the computing device to create a plurality of virtual functions (VFs) in an I/O adapter of the data processing system, configure at least one first VF to support non-native I/O virtualization (IOV) in the I/O adapter, and configure at least one second VF to support native IOV in the I/O adapter. The computer readable program may further cause the computing device to perform I/O operations between a host system of the data processing system and the I/O adapter utilizing native IOV and the at least one second VF and perform I/O operations between the host system and the I/O adapter utilizing non-native IOV and the at least one first VF.

In another illustrative embodiment, a data processing system comprising a host system and an input/output (I/O) adapter coupled to the host system. The host system may create a plurality of virtual functions (VFs) in an I/O adapter of the data processing system, configure at least one first VF to support non-native I/O virtualization (IOV) in the I/O adapter, and configure at least one second VF to support native IOV in the I/O adapter. The host system may further perform I/O operations between the host system and the I/O adapter utilizing native IOV and the at least one second VF and perform I/O operations between the host system and the I/O adapter utilizing non-native IOV and the at least one first VF.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary diagram illustrating a first approach to virtualizing I/O of a PCI root complex using a I/O virtualization intermediary;

FIG. 4 is an exemplary diagram illustrating a second approach to virtualizing I/O of a PCI root complex using natively shared PCI I/O adapters;

FIG. 5 is an exemplary diagram of a PCIe I/O virtualization enabled endpoint;

DETAILED DESCRIPTION OF THE INVENTION

Figure 1:
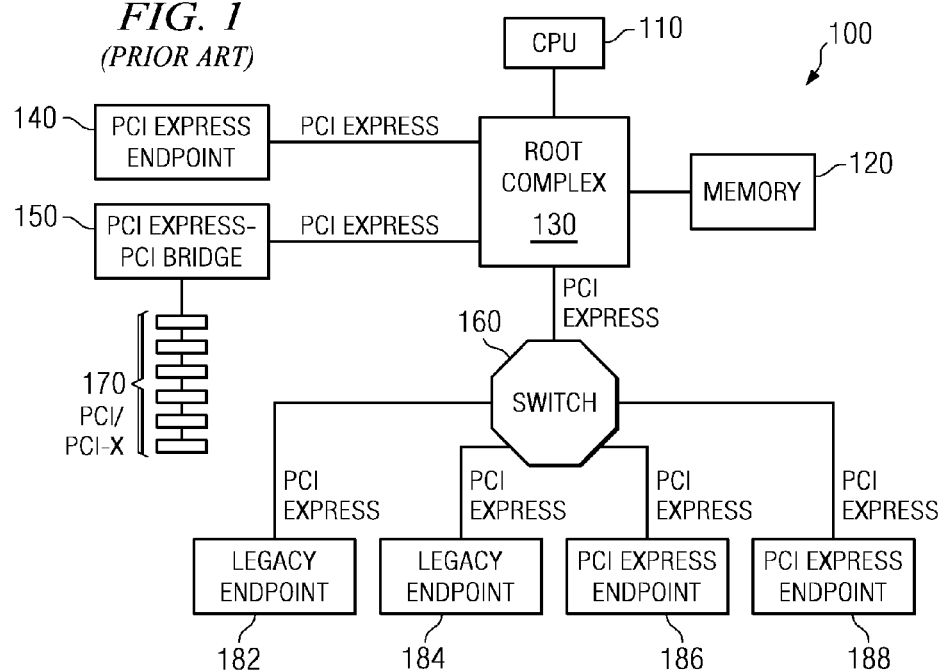
FIG. 1 is an exemplary diagram illustrating a PCIe fabric topology as is generally known in the art.

As discussed above, the PCI-SIG provides a standard for defining how to design an IOA which can be shared by several LPARs via a VI. However, the use of a VI hinders performance since all I/O transactions are required to go through the VI. In order to combat this performance hindrance, the PCI-SIG IOV Workgroup is standardizing native IOV which is the capability for a single physical I/O adapter or endpoint to be directly shared between partitions on a single system and across systems. With native IOV, the physical I/O adapter or endpoint supports one or more virtual endpoints (VE) which can, without runtime intervention by a VI, directly sink I/O and memory operations from a system image and source direct memory access (DMA) completion and interrupt operations to a system image. The case where an I/O adapter or endpoint is natively shared between partitions within a single system is referred to as native single-root IOV (SR-IOV). The case where an I/O adapter or endpoint is natively shared across multiple systems is referred to as native multi-root IOV (MR-IOV).

While the PCI-SIG is standardizing native IOV in I/O adapters and endpoints, a problem still exists with the native IOV that is being standardized. Specifically, if an I/O adapter or endpoint is designed to support a small number of virtual functions (VFs), and a system contains more LPARs and system images than the number of VFs supported in the I/O adapter or endpoint, then not all of the LPARs and system images may share the same adapter. Thus, the number of VFs supported in the I/O adapter or endpoint is a limiting factor on the number of LPARs and system images of a system that can share an I/O adapter or endpoint. Therefore, a system may require additional I/O adapters or endpoints in order to service all of the LPARs and system images running in the system.

The illustrative embodiments define a mechanism to enable both native and non-native input/output virtualization (IOV) in a single adapter. The mechanism of the illustrative embodiments allows a system with a large number of logical partitions (LPARs) and system images to use IOV to share a native IOV enabled I/O adapter or endpoint that does not implement the necessary number of virtual functions (VFs) for each LPAR and system image. For example, if a system contains 16 LPARs, but the I/O adapter or endpoint only implements 4 VFs, then the I/O adapter or endpoint may be configured to enable 3 VFs for native IOV and 1 VF for non-native IOV. In this way, the 3 VFs may each be directly mapped to a LPAR with the remaining VF being assigned to a virtual intermediary (VI), such as a virtual I/O server (VIOS), hypervisor, or the like. The VF that is associated with the VIOS may then require that all remaining LPARs be shared through the VIOS.

Thus, with the mechanisms of the illustrative embodiments, any number of LPARs and system images may share the same I/O adapter or endpoint. Some of the LPARs and system images may make use of native IOV based on the number of VFs supported by the I/O adapter or endpoint. The remaining LPARs and system images may still share the same I/O adapter or endpoint but must make use of non-native IOV supported by the same I/O adapter or endpoint. As a result, a system may make use of a smaller number of I/O adapters or endpoints. In order to understand the mechanisms of the illustrative embodiments, it is important to first understand how I/O virtualization may be implemented in a system utilizing a hypervisor or other virtualization platform.

It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters. Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
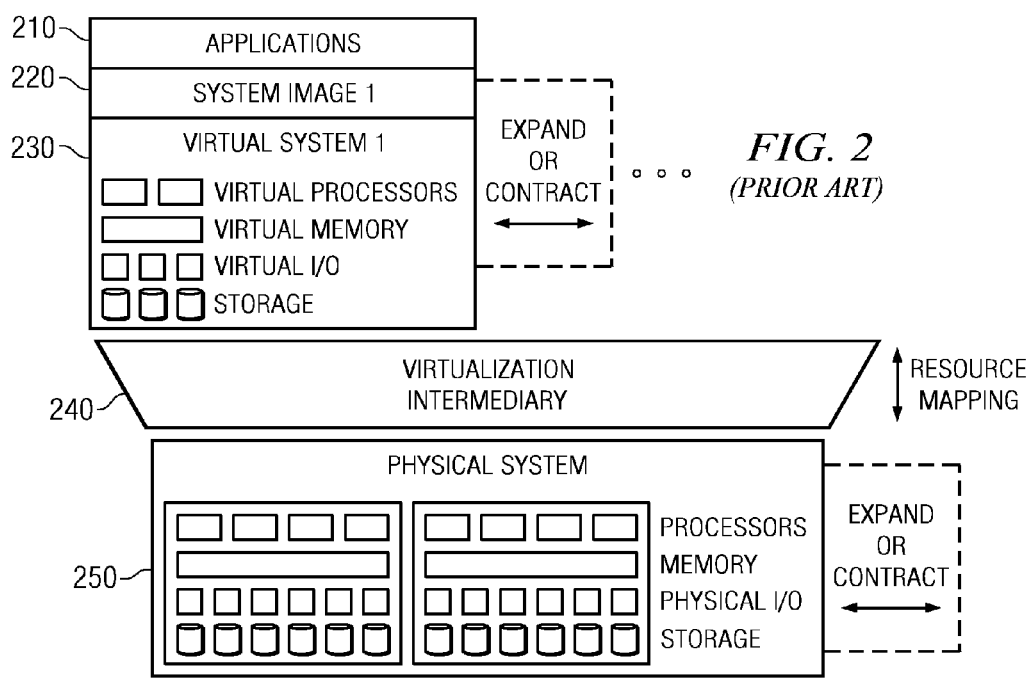
FIG. 2 is an exemplary diagram illustrating system virtualization as is generally known in the art.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization intermediary which creates virtual resources and maps them to the physical resources thereby providing isolation between virtual resources. The virtualization intermediary is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization intermediary 240. The virtualization intermediary 240 manages the allocation of resources to a SI and isolates resources assigned to a SI from access by other SIs. This allocation and isolation is often performed based on a resource mapping performed by the virtualization intermediary 240 and one or more resource mapping data structures maintained by the virtualization intermediary 240.

Such virtualization may be used to allow virtualization of I/O operations and I/O resources. That is, with regard to I/O virtualization (IOV), a single physical I/O unit may be shared by more than one SI using an I/O virtualization intermediary (IOVI), such as virtualization intermediary 240. The IOVI may be software, firmware, or the like, that is used to support IOV by intervening on, for example, one or more of configuration, I/O, and memory operations from a SI, and direct memory access (DMA), completion, and interrupt operations to a SI.

FIG. 3 is an exemplary diagram illustrating a first approach to virtualizing I/O of a PCI root complex using an I/O virtualization intermediary. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the I/O virtualization intermediary 340, PCIe root complex 350, and one or more PCIe switches 360, and/or other PCIe fabric elements.

With the approach illustrated in FIG. 3, the I/O virtualization intermediary 340 is involved in all I/O transactions and performs all I/O virtualization functions. For example, the I/O virtualization intermediary 340 multiplexes I/O requests from the various SIs' I/O queues onto a single queue in the PCIe endpoints 370-390. Thus, the I/O virtualization intermediary acts as a proxy between the SIs 320-330 and the physical PCIe endpoints 370-390.

Such involvement by the I/O virtualization intermediary 340 may introduce additional delay in the I/O operations which limits the number of I/O operations per unit of time, and thus limits I/O performance. In addition, the involvement of the I/O intermediary requires extra CPU cycles, thus reducing the CPU performance that is available to other system operations. Extra context switches and interrupt redirection mechanisms required by this approach can also affect overall system performance. Furthermore, an IOVI 340 is not feasible when an endpoint 370-390 is shared between multiple root complexes.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complex interrupt table data structures are accessible through the PCIe memory address space and are used to map interrupts to appropriate interrupt handlers associated with SIs, for example.

As with the arrangement shown in FIG. 3, an I/O virtualization interface 450 is provided in the virtualization structure of FIG. 4 as well. The I/O virtualization interface 450 is used with non-IOV enabled PCIe endpoints that may be coupled to the PCIe switch 460. That is, the I/O virtualization interface (IOVI) 450 is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the IOVI 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the IOVI 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490, as will be described in greater detail hereafter. The ability to perform direct I/O operations greatly increases the speed at which I/O operations may be performed, but requires that the PCIe endpoints 470-490 support I/O virtualization.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by an I/O virtualization intermediary, directly be a sink for I/O and memory operations from a system image, and be a source of Direct Memory Access (DMA), completion, and interrupt operations to a system image (SI).

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. Exemplary relationships between physical and virtual functions will be illustrated in FIGS. 6 and 7 hereafter.

Figure 6:
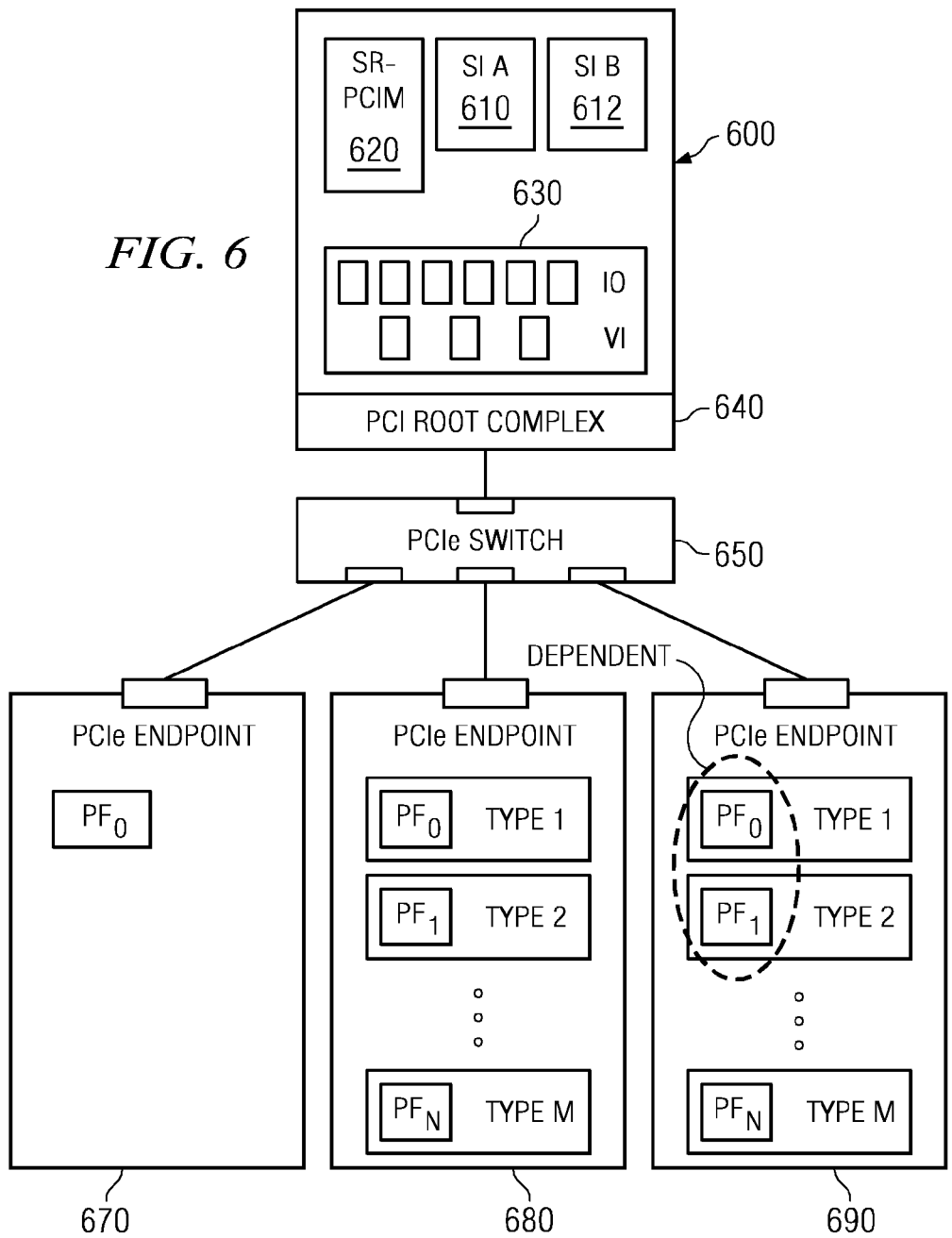
FIG. 6 is an exemplary diagram illustrating physical and virtual functions of single root endpoints without native virtualization.

FIG. 6 is an exemplary diagram illustrating physical and virtual functions of single root endpoints without native virtualization. The term "single root endpoints" refers to an endpoint that is associated with a single root complex of a single root node, i.e. a single host system. With a single root endpoint, the endpoint may be shared by a plurality of system images (SIs) associated with a single root complex, but cannot be shared among a plurality of root complexes on the same or different root nodes.

As shown in FIG. 6, the root node 600 includes a plurality of system images 610, 612, which communicate with PCIe endpoints 670-690, an I/O virtualization intermediary 630 (which is used as previously described), PCIe root complex 640, and one or more PCIe switches 650 and/or other PCIe fabric elements. The root node 600 further includes a single root PCIe configuration management (SR-PCIM) unit 620. The SR-PCIM unit 620 is responsible for managing the PCIe fabric, which includes the root complex 640, the one or more PCIe switches 650, and the like, and the endpoints 670-690. The management responsibilities of SR-PCIM 620 include determination of which functions are to be assigned to which SIs 610, 612 and the setup of the configuration space of the endpoints 670-690. The SR-PCIM 620 may configure the functions of the various endpoints 670-690 based on a SI's capabilities and input from a user, such as a system administrator, or load balancing software as to which resources are to be assigned to which SIs 610, 612. A SI's capabilities may include various factors including how much address space is available to allocate to the endpoint 670-690, how many interrupts are available to be assigned to the endpoint 670-690, and the like.

Each of the PCIe endpoints 670-690 may support one or more physical functions (PFs). The one or more PFs may be independent of each other or may be dependent upon each other in some fashion. A PF may be dependent upon another PF based on vendor defined function dependencies wherein one PF requires the operation of another PF or the result generated by another PF, for example, in order to operate properly. In the depicted example, PCIe endpoint 670 supports a single PF and PCIe endpoint 680 supports a plurality of independent PFs, i.e. $PF_0$ to $PF_N$, of different types 1 to M. A type relates to the functionality of the PF or VF, e.g., an Ethernet function and a Fiber Channel function are two different types of functions. Endpoint 690 supports multiple PFs of different types with two or more of the PFs being dependent. In the depicted example, $PF_0$ is dependent upon $PF_1$, or vice versa.

In the example shown in FIG. 6, the endpoints 670-690 are shared by the system images (SIs) 610 and 612 through the virtualization mechanisms made available by the I/O virtualization intermediary (IOVI) 630. As described previously, in such an arrangement, the IOVI 630 is involved in all PCIe transactions between the SIs 610, 612 and the PCIe endpoints 670-690. The individual PCIe endpoints 670-690 need not support virtualization in themselves since the burden of handling the virtualization is placed entirely on the IOVI 630. As a result, while known mechanisms for virtualization may be used in such an arrangement, the rate by which I/O operations may be performed is relatively slow compared to the potential for I/O rates if the IOVI 630 were not involved in every I/O operation.

Figure 7:
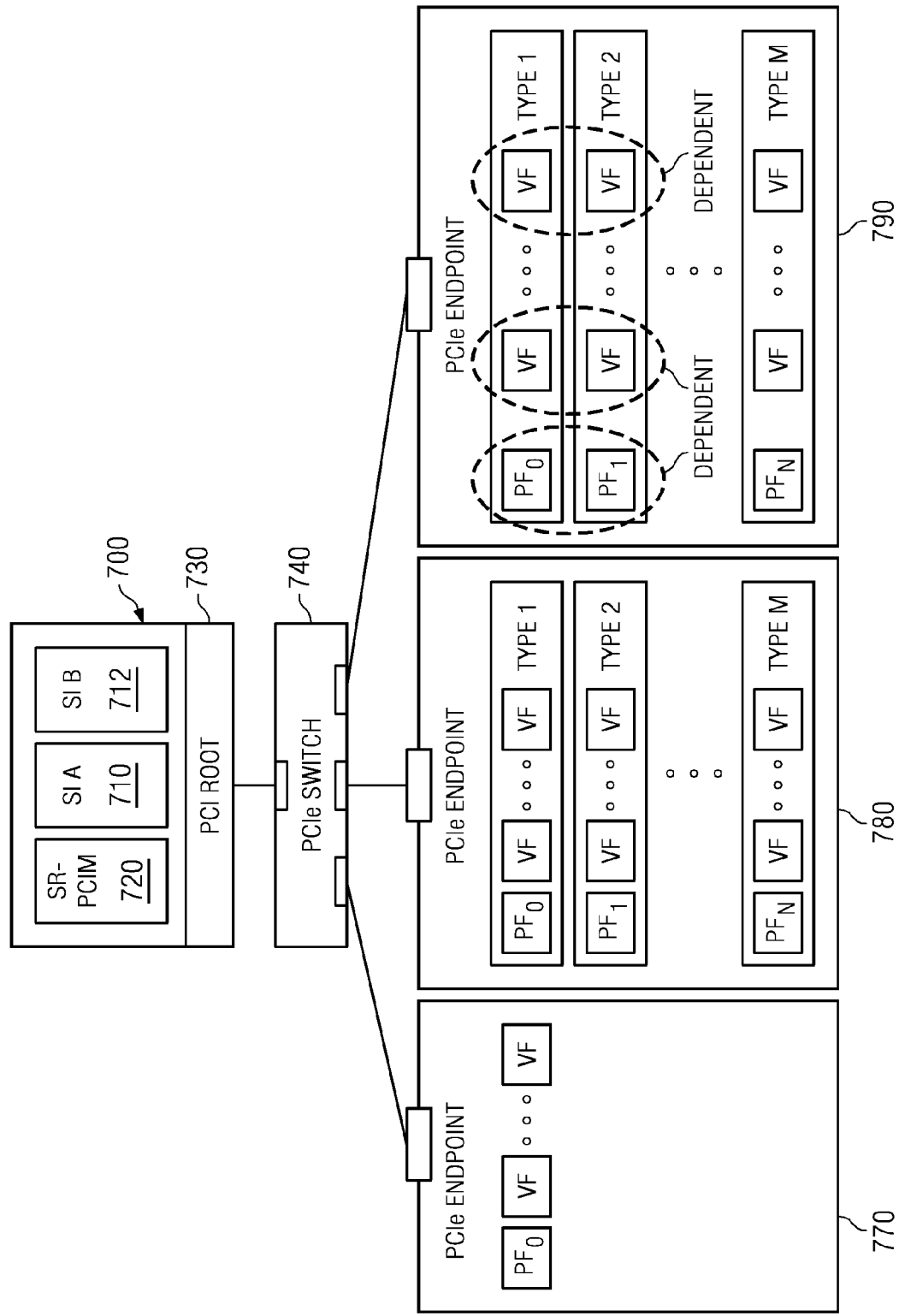
FIG. 7 is an exemplary diagram illustrating physical and virtual functions of single root endpoints enabled for native I/O virtualization.

FIG. 7 is an exemplary diagram illustrating physical and virtual functions of single root endpoints enabled for native I/O virtualization. The arrangement shown in FIG. 7 is similar to that of FIG. 6 with some important differences due to the PCIe endpoints 770-790 supporting I/O virtualization (IOV) natively, i.e. within the endpoints themselves. As a result, the I/O virtualization intermediary 630 in FIG. 6 may be effectively eliminated, except of course for configuration operations, with regard to the IOV enabled PCIe endpoints 770-790. However, if non-IOV enabled PCIe endpoints (not shown) are also utilized in the arrangement, e.g., legacy endpoints, an I/O virtualization intermediary may be used in conjunction with the elements shown in FIG. 7 to handle sharing of such non-IOV enabled PCIe endpoints between the system images 710 and 712.

As shown in FIG. 7, the IOV enabled PCIe endpoints 770-790 may support one or more independent or dependent physical functions (PFs) which in turn may be associated with one or more independent or dependent virtual functions (VFs). In this context, the PFs are used by the SR-PCIM 720 to manage a set of VFs and are also used to manage endpoint functions, such as physical errors and events. The configuration spaces associated with the PFs define the capabilities of the VFs including the maximum number of VFs associated with the PF, combinations of the PFs and VFs with other PFs and VFs, and the like.

The VFs are used by SIs to access resources, e.g., memory spaces, queues, interrupts, and the like, on the IOV enabled PCIe endpoints 770-790. Thus, a different VF is generated for each SI 710, 712 which is going to share a specific PF. VFs are generated by the endpoint 770-790 based on the setting of the number of VFs by the SR-PCIM 720 in the configuration space of the corresponding PF. In this way, the PF is virtualized so that it may be shared by a plurality of SIs 710, 712.

As shown in FIG. 7, the VFs and PFs may be dependent upon other VFs and PFs. Typically, if a PF is a dependent PF, then all of the VFs associated with that PF will also be dependent. Thus, for example, the VFs of the $PF_0$ may be dependent upon corresponding VFs of $PF_1$.

With the arrangement shown in FIG. 7, the SIs 710, 712 may communicate directly, via the PCI root complex 730 and PCIe switch 740, with the IOV enabled PCIe endpoints 770-790 and vice versa without the need for involvement by an I/O virtualization intermediary. Such direct communication is made possible by virtue of the IOV support provided in the endpoints 770-790 and in the SR-PCIM 720, which configures the PFs and VFs in the endpoints 770-790.

The direct communication between the SIs and the endpoints greatly increases the speed at which I/O operations may be performed between a plurality SIs 710, 712 and shared IOV enabled PCIe endpoints 770-790. However, in order for such performance enhancements to be made possible, the PCIe endpoints 770-790 must support I/O virtualization by providing mechanisms in the SR-PCIM 720 and the physical functions (PFs) of the endpoints 770-790 for generating and managing virtual functions (VFs).

The above illustrations of a PCIe hierarchy are limited to single root hierarchies. In other words, the PCIe endpoints are only shared by SIs 710, 712 on a single root node 700 associated with a single PCI root complex 730. The mechanisms described above do not provide support for multiple root complexes sharing the PCIe endpoints. Thus, multiple root nodes cannot be provided with shared access to the resources of a PCIe endpoint. This limits the scalability of systems utilizing such arrangements since a separate set of endpoints is required for each root node.

The illustrative embodiments herein make use of multi-root I/O virtualization in which multiple PCI root complexes may share access to the same set of IOV enabled PCIe endpoints. As a result, the system images associated with each of these PCI root complexes may each share access to the same set of IOV enabled PCIe endpoint resources but with the protections of virtualization being in place for each SI on each root node. Thus, scalability is maximized by providing a mechanism for allowing addition of root nodes and corresponding PCI root complexes which may share the same existing set of IOV enabled PCIe endpoints.

Figure 8:
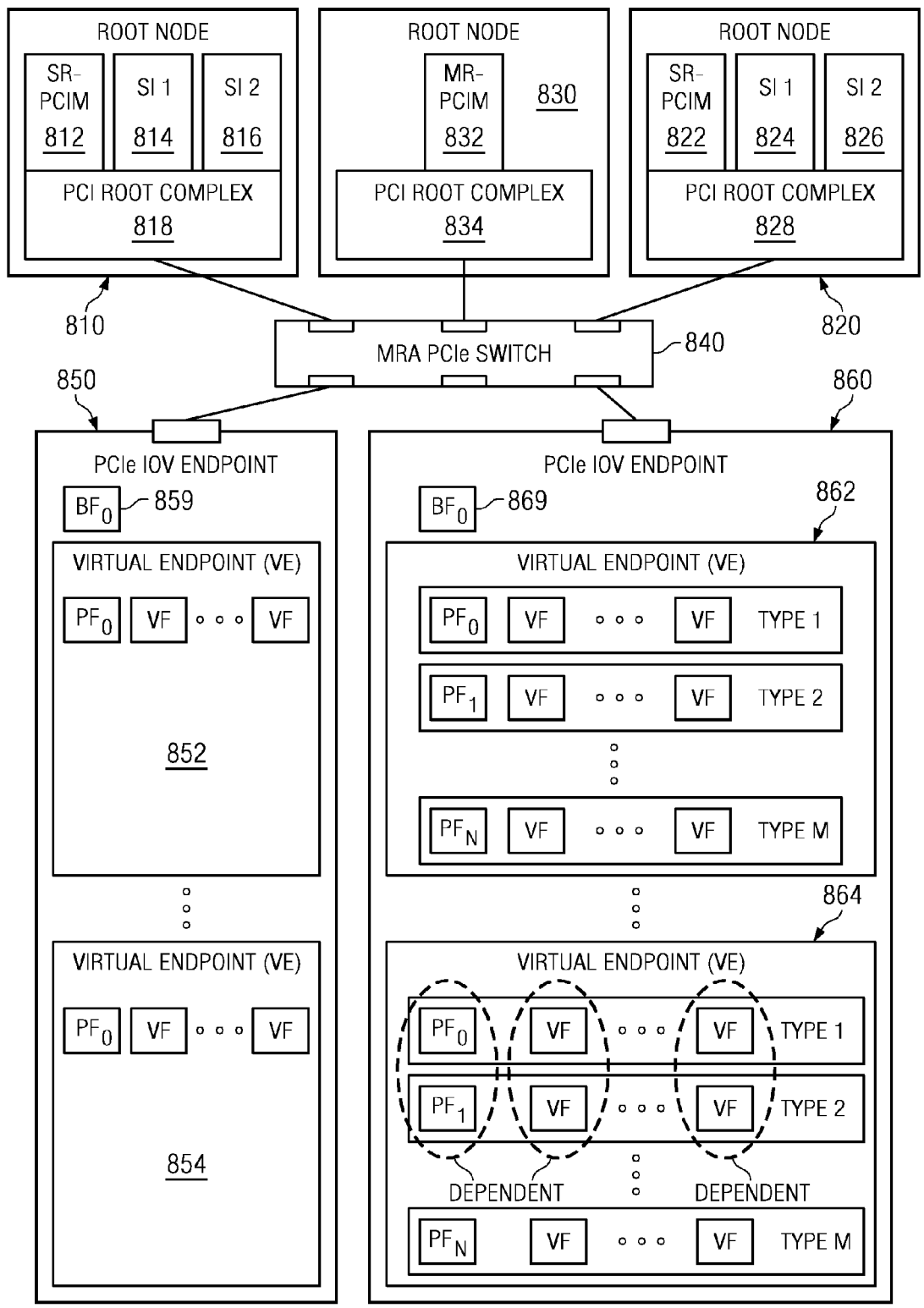
FIG. 8 is an exemplary diagram illustrating a multi-root virtualized I/O topology in accordance with one illustrative embodiment.

FIG. 8 is an exemplary diagram illustrating a multi-root virtualized I/O topology in accordance with one illustrative embodiment. As shown in FIG. 8, a plurality of root nodes 810 and 820 are provided with each root node having a single root PCI configuration manager (SR-PCIM) 812, 822, one or more system images (SIs) 814, 816, 824, and 826, and a PCI root complex 818 and 828. These root nodes 810 and 820, which may be, for example, blades in a blade server, are coupled to one or more multi-root aware (MRA) PCIe switches 840 of a PCIe switch fabric which may include one or more such MRA PCIe switches 840, and/or other PCIe fabric elements. The MRA switch 840 is of a different type than the non-MRA switch 740 in FIG. 7 in that the MRA switch 840 has connections for additional root nodes and contains the mechanisms required for keeping the address spaces of those different root nodes separate and distinct.

In addition to these root nodes 810 and 820, a third root node 830 is provided that includes a multi-root PCI configuration manager (MR-PCIM) 832 and corresponding PCI root complex 834. The MR-PCIM 832 is responsible for discovering and configuring virtual hierarchies within the multi-root (MR) topology shown in FIG. 8, as will be discussed in greater detail hereafter. Thus, the MR-PCIM 832 configures the physical and virtual functions of the endpoints with regard to multiple root complexes of multiple root nodes. The SR-PCIMs 812 and 822 configure the physical and virtual functions of their associated single root complex. In other words, the MR-PCIM sees the MR topology as a whole, while the SR-PCIM sees only its own virtual hierarchy within the MR topology, as described in greater detail hereafter.

As shown in FIG. 8, the IOV enabled PCIe endpoints 850 and 860 support one or more virtual endpoints (VEs) 852, 854, 862, and 864. A VE is a set of physical and virtual functions assigned to a root complex. Thus, for example, a separate VE 852 and 862 are provided on the IOV enabled PCIe endpoints 850 and 860 for the PCI root complex 818 of root node 810. Similarly, a separate VE 854 and 864 are provided on the IOV enabled PCIe endpoints 850 and 860 for the PCI root complex 828 of root node 820.

Each VE is assigned to a virtual hierarchy (VH) having a single root complex as the root of the VH and the VE as a terminating node in the hierarchy. A VH is a fully functional PCIe hierarchy that is assigned to a root complex or SR-PCIM. It should be noted that all physical functions (PFs) and virtual functions (VFs) in a VE are assigned to the same VH.

Each IOV enabled PCIe endpoint 850 and 860 supports a base function (BF) 859 and 869. The BF 859, 869 is a physical function used by the MR-PCIM 832 to manage the VEs of the corresponding endpoint 850, 860. For example, the BF 859, 869 is responsible for assigning functions to the VEs of the corresponding endpoints 850, 860. The MR-PCIM 832 assigns functions to the VEs by using the fields in the BF's configuration space that allows assignment of a VH number to each of the PFs in the endpoint 850, 860. In the illustrative embodiments, there can be only one BF per endpoint, although the present invention is not limited to such.

As shown in FIG. 8, each VE 852, 854, 862, and 864 may support their own set of physical and virtual functions. As described previously, such sets of functions may include independent physical functions, dependent physical functions, and their associated independent/dependent virtual functions. As shown in FIG. 8, VE 852 supports a single physical function ($PF_0$) with its associated virtual functions (VFs). VE 854 likewise supports a single physical function ($PF_0$) with its associated virtual functions (VFs). VE 862 supports a plurality of independent physical functions ($PF_0$-$PF_N$) and their associated virtual functions (VFs). VE 864, however, supports a plurality of dependent physical functions ($PF_0$-$PF_N$).

A VE 852, 854, 862, or 864 may directly communicate with the SIs 814, 816, 824, and 826 of the root nodes 810 and 820, if and only if the VE is assigned to a VH to which the SI has access, and vice versa. The endpoints 850 and 860 themselves must support single root I/O virtualization and multi-root I/O virtualization. Single root I/O virtualization is described above. Multi-root I/O virtualization is described hereafter and in commonly owned and co-pending U.S. patent application Ser. No. 11/612,543.

Figure 9:
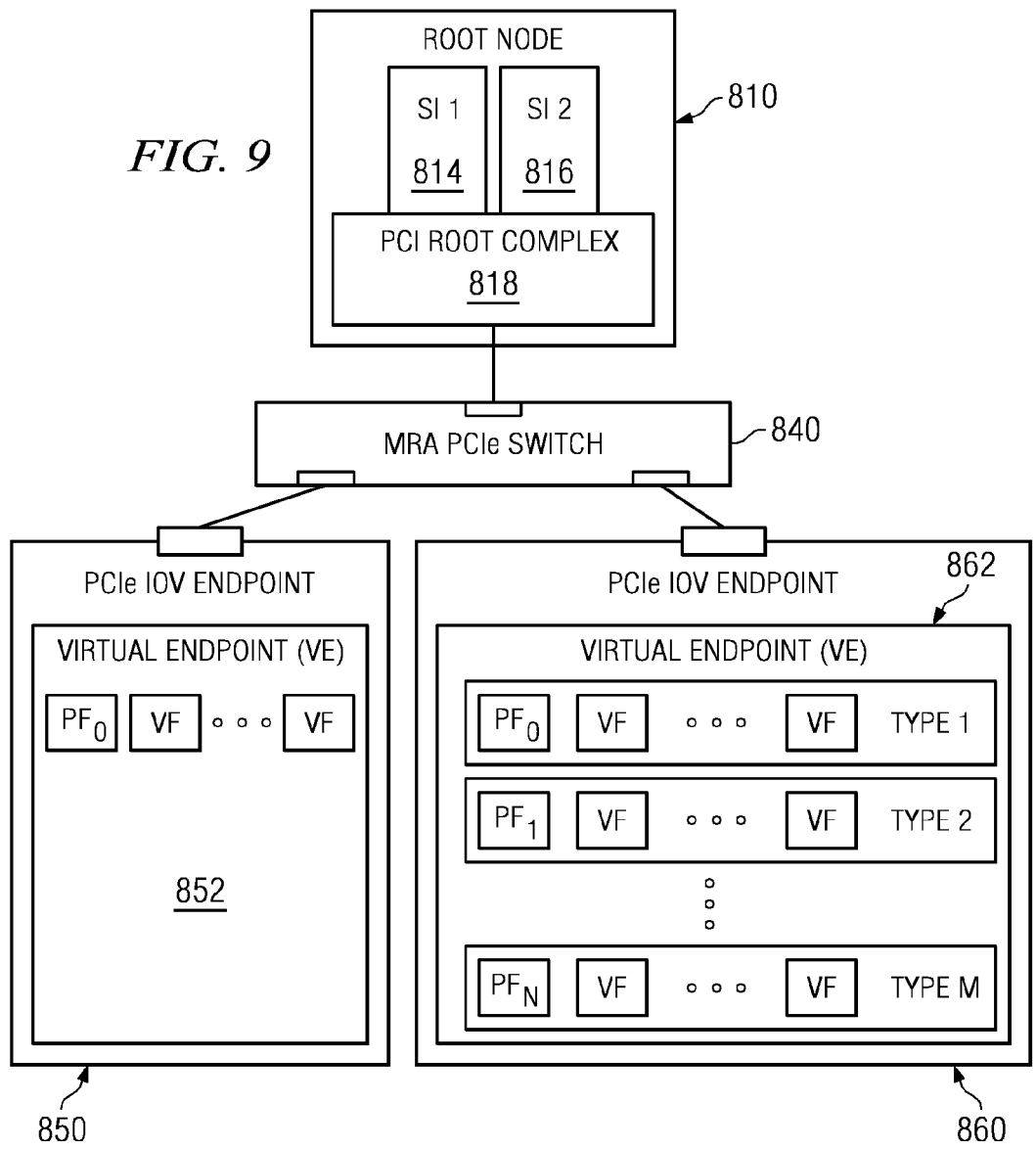
FIG. 9 is an exemplary diagram illustrating a virtual hierarchy view of a multi-root virtualized I/O topology from the viewpoint of a SR-PCIM of a root node in accordance with one illustrative embodiment.

FIG. 9 is an exemplary diagram illustrating a virtual hierarchy view of a multi-root virtualized I/O topology from the viewpoint of a root complex of a root node. As shown in FIG. 9, while the multi-root (MR) topology may be as shown in FIG. 8, each root complex of each individual root node views only its portion of the MR topology. Thus, for example, the PCI root complex 818 associated with root node 810 sees its host processor set, its own system images (SIs) 814, 816, the MRA switch 840, and its own virtual endpoints (VEs) 852 and 862. There is full PCIe functionality within this virtual hierarchy, however, the PCI root complex 818 does not see the VEs, root complexes, system images, etc, that are not part of its own virtual hierarchy.

Because of this arrangement, limitations are imposed on the communication between root complexes of root nodes in a MR topology. That is, since PCIe functionality is limited to the virtual hierarchy associated with the root complex, root complexes cannot communicate with one another. Moreover, the system images associated with the various root complexes cannot communicate with system images of other root complexes. In order to address such limitations, the illustrative embodiments herein provide various mechanisms to provide support for communications between virtual hierarchies and specifically, root complexes of different root nodes.

In order for a host system of the illustrative embodiments to communicate with multiple endpoints via its root complex, the host system uses a shared memory that is shared by the various endpoints and root complexes with which the host system is associated. In order to ensure proper operation of the endpoints with the host system, this shared memory must be initialized such that each endpoint that is associated with the host system is provided with its own portion of the shared memory through which various communications may be performed. The illustrative embodiments utilize a mechanism for initializing the shared memory of a host system in which the PCIe fabric is discovered and endpoints of the PCIe fabric are virtually tied to root complexes of the host systems. Each endpoint and root complex is then given its own portion of a shared memory address space of each host system to which it is virtually tied. Through these portions of the host systems' shared memories, an endpoint associated with a root complex of one host system may communicate with one or more other root complexes of other host systems.

Figure 10:
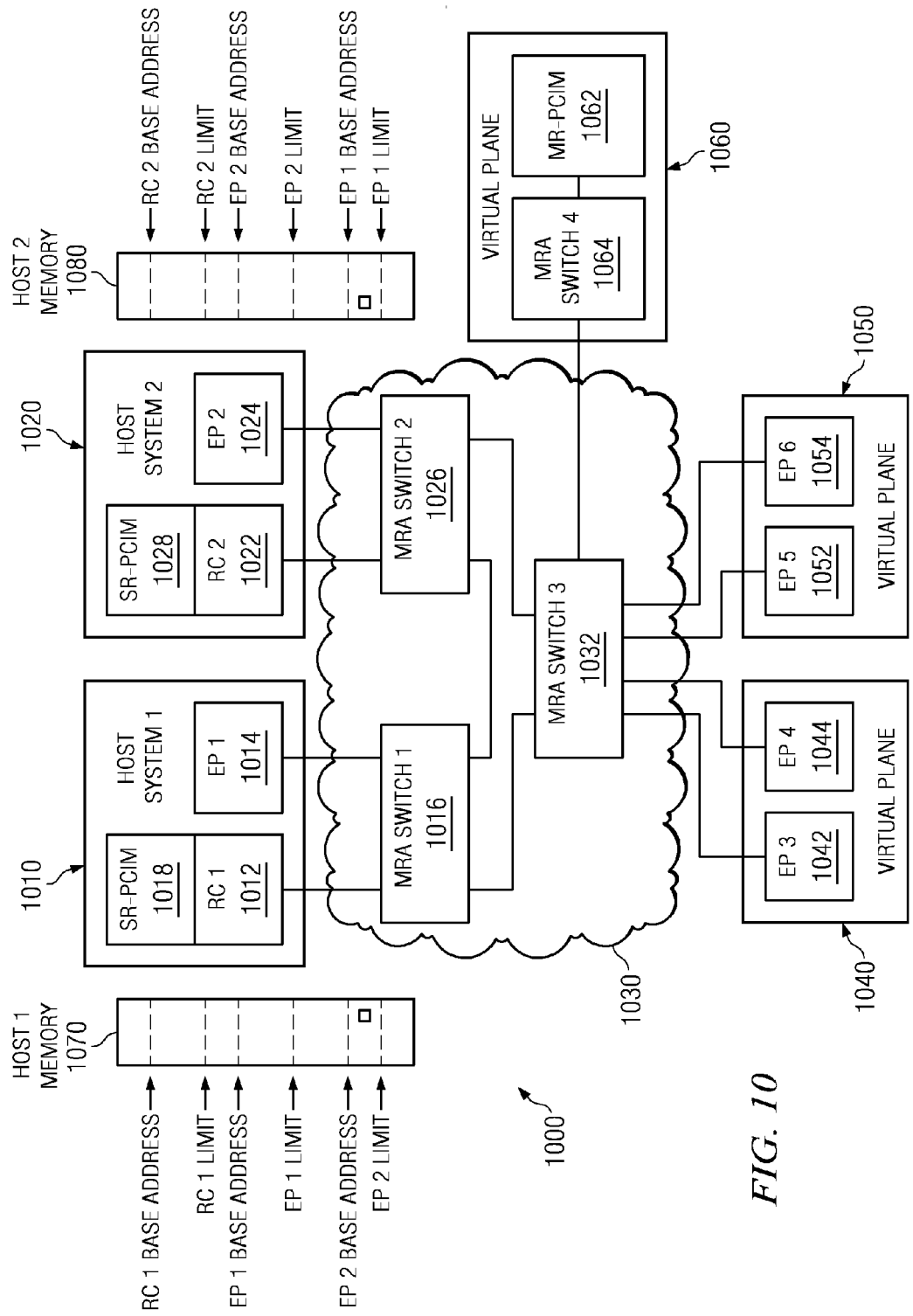
FIG. 10 is an exemplary diagram illustrating a shared memory PCIe based system in accordance with one illustrative embodiment.

FIG. 10 is an exemplary diagram illustrating a shared memory PCIe based system in accordance with one illustrative embodiment. As shown in FIG. 10, a system 1000 has a host system 1010 that comprises a first root complex (RC1) 1012 and a first endpoint (EP1) 1014, and is associated with a first multiple-root aware (MRA) switch 1016, which may also be provided as part of the host system 1010. The system 1000 has a second host system 1020 that comprises a second root complex (RC2) 1022 and a second endpoint (EP2) 1024, and is associated with a second multiple-root aware (MRA) switch 1026, which may also be provided as part of the host system 1020. Each of these host systems 1010 and 1020 may represent, for example, separate blades in a same multi-root blade cluster system 1000. Alternatively, the host systems 1010 and 1020 may be provided on separate computing devices entirely. Each host system 1010 and 1020 is in its own virtual hierarchy (VH). The host systems 1010 and 1020 are connected to one another and with other shared endpoints EP3-EP6 1042-1044 and 1052-1054, via communication links with one or more MRA switches 1016, 1026, and 1032 of a PCIe fabric 1030. The communication links associated with the host systems 1010 and 1020 and endpoints 1042-1044 and 1052-1054 may be associated with one or more virtual planes (VPs).

There are no virtual hierarchy (VH) identifiers used in a PCIe fabric to distinguish which host system 1010 and 1020 is associated with a given PCIe transaction. Instead a link local virtual plane (VP) identifier is used. Since the VP identifier is link local, RC 1's VH may have, for example, VP=4 on a link between 1032 and 1016 and VP=4 on a link between 1032 and 1042. In other words, a VH is made up of a set of PCIe components and the links that attach those components, with each of those links having a link local VP identifier used to designate which VH a given transaction is referencing.

In the depicted example, the goal is to permit the root complex 1012, and thus, the applications running in association with one or more system images associated with the root complex 1012, to communicate with an endpoint associated with another root complex, e.g., endpoint EP2 1024 associated with root complex RC2 1022. Thus, for example, EP2 1024 may be used as an endpoint by system images running on root complex RC1 1012. In this way, endpoints that are co-resident with root complexes may be shared across system images on various virtual planes and/or host systems. As a result, high performance node-to-node, i.e. host system to host system, communications and load balancing may be facilitated as well as system cost reduction by eliminating the need to go through an external networking adapter and switch, such as an InfiniBand or Ethernet switch, when communicating between the nodes.

In order to permit endpoints to be shared by system images across host systems, a multi-root PCI configuration manager (MR-PCIM) 1062, provided in one of the host systems 1010 or 1020, or a separate host system 1060, initializes the host systems' memory spaces 1070 and 1080 to establish base and limit apertures for the root complexes and endpoints. The MR-PCIM 1062 accesses the PCIe fabric 1030 via the MRA switch 1064 and one or more MRA switches 1032 in the PCIe fabric 1030.

The MR-PCIM 1062 traverses the links of the PCIe fabric 1030 through the various interconnected switches, in a manner generally known in the art, to identify the root complexes and endpoints associated with the PCIe fabric 1030. With the traversal performed by the illustrative embodiments, however, all of the root complexes (RCs), with the exception of the root complex (RC) performing the discovery fabric traversal operation, are treated as endpoints during the discovery fabric traversal.

As the MR-PCIM 1062 traverses the PCIe fabric, it performs a number of checks between the root complexes and the endpoints to determine if a given root complex is associated with a given endpoint. From the resulting information, the MR-PCIM 1062 generates one or more virtual PCI tree data structures that tie the endpoints available on the PCIe fabric 1030 to each of the root complexes. Endpoints that are associated with the same root complex, are associated with each other in the virtual PCI tree data structures.

After the MR-PCIM 1062 discovers and configures the fabric, the respective RCs allow their associated SR-PCIMs 1018 and 1028 to discover and configure the VHs. Each SR-PCIM 1018, 1028 assigns, for each given endpoint, a base address and limit within the PCIe memory address space(s) to which it belongs, e.g., the PCIe memory address space(s) associated with host system 1 memory 1070 and host system 2 memory 1080. The SR-PCIM 1018, 1028 writes this base address and limit to the Base Address Register (BAR) of the EP. Work requests and completion messages may then be written to these portions of the PCI memory address space(s) in order to facilitate communication between the various root complexes and the endpoints across host systems 1010 and 1020, as will be described in greater detail hereafter.

As mentioned above, with the illustrative embodiments, the MR-PCIM 1062 performs a number of checks between the root complexes and the endpoints as it traverses the PCIe fabric 1030. For example, the MR-PCIM 1062 accesses the PCIe configuration space of each function, physical function and virtual function of an EP, the PCIe configuration spaces being located in the EPs, as defined by the PCI specifications. The MR-PCIM also accesses the Vital Product Data (VPD) fields for each endpoint and stores the VPD information for later comparison, such as in a non-volatile storage area (not shown) coupled to the MR-PCIM 1062, for example.

VPD is the information that uniquely defines items such as hardware, software, and microcode elements of a system. The VPD provides the system with information on various field replaceable units (FRUs) including vendor name, part number, serial number, and other detailed information that is useful for administration, asset management, and anything that requires unique identification of the PCI device. The VPD information typically resides in a storage device, e.g., a serial EEPROM, in a PCI device, such as an endpoint 1014, 1024. More information regarding VPD may be obtained from the PCI Local Bus Specification, Revision 3.0 available at www-.pcisig.com.

The MR-PCIM 1062, after having retrieved and stored the VPD information for each of the endpoints 1014, 1024, 1042, 1044, 1052, and 1054, identifies which EP's and RC's reside on the same hardware device, e.g. blade. For example, the MR-PCIM 1062 accesses the VPD information of a MRA switch 1016, 1026, 1032 which contains a co-residency field that indicates that it is associated with a hardware device which holds an RC and an EP. The MRA switch 1016, 1026, 1032 stores the VH assigned to the RC which may then be used to determine which EPs and RCs reside on the same hardware device.

Figure 11A:
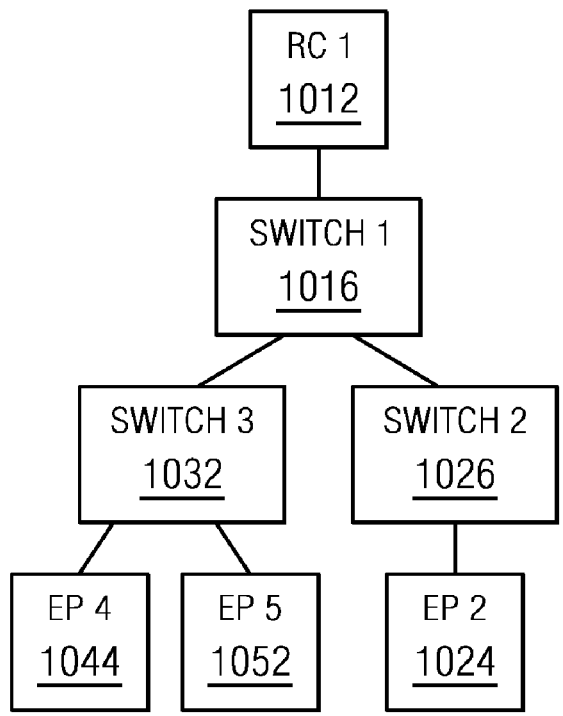
FIGS. 11A and 11B are diagrams representing exemplary virtual PCI tree data structures in accordance with one illustrative embodiment.
Figure 11B:
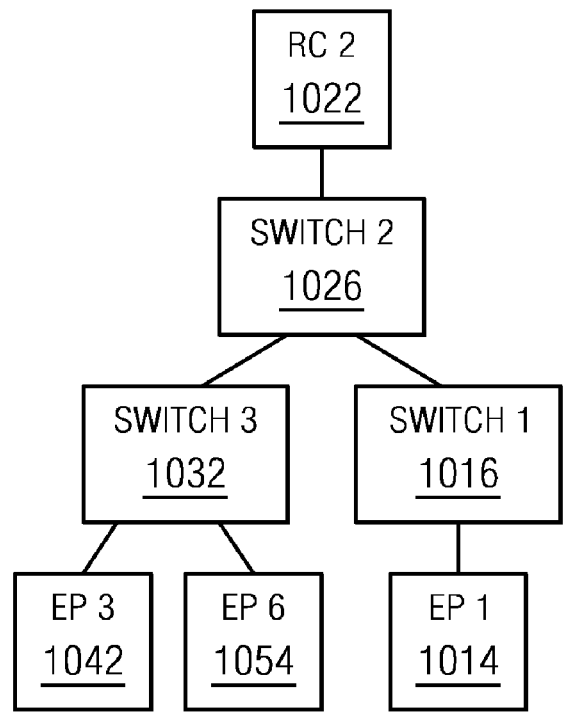

After determining that an EP co-exists with a RC on the same host, the MR-PCIM 1062 creates one or more virtual PCI tree data structures, such as illustrated in FIGS. 11A and 11B. As shown in FIGS. 11A and 11B, the virtual PCI tree data structure ties the endpoints available on the PCIe fabric to each root complex.

It is assumed in the virtual PCI tree data structure shown in FIG. 11A that the endpoints EP2 1024, EP4 1044, and EP5 1052 are associated with root complex RC1 1012 via assignments indicated to the MR-PCIM 1062 by the user. The VPD matching described above is only performed to allow a RC to determine that an EP is physically residing on the RC's host. This tells the RC that the EP is accessible to the RC through standard PCI memory mapped addressing in the RC's address space. This is a physical association. With the virtual PCI tree data structures, logical associations are specified by way of a user indicating that he/she wants the MR-PCIM 1062 to create such logical associations.

Similarly, it is assumed in FIG. 11B that the endpoints EP1 1014, EP3 1042, and EP6 1054 are associated with root complex RC1 1012 via user input specifying logical associations, and their VPD information and the comparisons made by the MR-PCIM 1062. Thus, in the depicted example shown in FIG. 11A, endpoint EP2 1024 is associated with, or tied with, root complex RC1 1012 via switch 2 1026 and switch 1 1016. Endpoints EP4 1044 and EP5 1052 are associated with root complex RC1 1012 via switch 3 1032 and switch 1 1016. In FIG. 11B, endpoint EP1 1014 is associated with, or tied with, root complex RC2 1022 via switch 1 1016 and switch 2 1026. Endpoints EP3 1042 and EP6 1054 are associated with root complex RC2 1022 via switch 3 1032.

Based on these virtual PCI tree data structures, the MR-PCIM 1062 assigns each endpoint a base address and limit within the PCIe memory address space(s) it belongs to. The base addresses may be stored in the endpoints' Base Address Registers (BARs). For example, EP1 1014 is accessible through two PCIe memory address spaces 1070 and 1080. In host system 1 1010, EP1 1014 is accessible by the host system's processor (not shown) through the host system's memory 1070 address space. In host system 2 1020, EP1 1014 has a PCIe aperture, defined by the EP1 base address and limit, in host system 2's memory 1080 address space that is accessible via memory mapped I/O through PCI bus memory addresses. The processor of host system 1 1010 may use a memory address translation and protection table (not shown), such as may be provided in a virtualization intermediary, such as a hypervisor, the root complex 1012, or the like, to map the PCIe memory addresses seen by the processor of host system 2 1020 into host system 1 memory addresses, for example.

Similarly, the endpoint EP2 1024 is accessible through two PCIe memory address spaces for host system memories 1070 and 1080. In host system 2 1020, EP2 1024 is accessible by host system 2's processor through host system 2's real memory addresses for its memory 1080. In host system 1 1010, EP2 1024 has a PCIe aperture, defined by the base address and limit for EP2 1024, in host system 1's memory 1070 that is accessible as memory mapped I/O through PCI bus memory addresses. Host system 2 1020 may use a memory address translation and protection table (not shown) to map the PCIe memory addresses seen by host system 1 1010 into host system 2 real memory addresses.

Similar portions of host system memories 1070 and 1080 may be initialized for the root complexes RC1 1012 and RC2 1022. For example, in host system 1 1010, RC1 1012 is accessible by host system 1's processor through host system 1's real memory addresses for host system 1's memory 1070. RC1 1012 has a PCIe aperture in host system 2's memory space that is accessible via direct memory access (DMA) I/O through host system 1's PCI bus memory addresses. Host system 1 1010 may use a memory address translation and protection table (not shown) to map the PCIe memory addresses seen by host system 2 1020 into host system 1 real memory addresses.

Similarly, in host system 2 1020, RC2 1022 is accessible by host system 2's processor through host system 2 real memory addresses for memory 1080. RC2 1022 has a PCIe aperture in host system 1's memory 1070 that is accessible as DMA I/O through host system 2's PCI bus memory addresses. Host system 2 1020 can use a memory address translation and protection table (not shown) to map the PCIe memory addresses seen by host system 1 1010 into host system 2 real memory addresses.

Thus, the mechanism of the illustrative embodiments provide for the initialization of memory spaces in the host systems such that an endpoint may be accessible by more than one root complex in a plurality of host systems. The portions of the memory spaces assigned to the various endpoints may then be utilized by the root complexes to send requests and completion messages to and from the endpoints.

While the above mechanisms allow I/O adapters or endpoints to be shared amongst a plurality of LPARs and system images of more than one root complex in a plurality of host systems, the number of LPARs and system images that may share an I/O adapter or endpoint is limited by the number of virtual functions (VFs) supported by the I/O adapters. That is, in a system that utilizes native IOV in the I/O adapters or endpoints, each LPAR and system image must be associated with its own VF. Thus, the number of VFs supported by the I/O adapter or endpoint is a directly limiting factor in the number of LPARs and system images that may natively share the I/O adapter or endpoint.

In order to address this limitation, the mechanisms of the illustrative embodiments enable the use of both native and non-native IOV in the same I/O adapter or endpoint. That is, the mechanisms of the illustrative embodiments allow a system with a large number of logical partitions (LPARs) and system images to use IOV to share a native IOV enabled I/O adapter or endpoint that does not implement the necessary number of virtual functions (VFs) for each LPAR and system image. In one illustrative embodiment, a number of VFs supported by the I/O adapter, less one, are assigned to LPARs and system images so that they may make use of native IOV using these VFs. The remaining VF is associated with a virtual intermediary (VI) which handles non-native IOV of the I/O adapter. Any remaining LPARs and system images share the I/O adapter using the non-native IOV via the VI.

For example, if a system contains 16 LPARs, but the I/O adapter or endpoint only implements 4 VFs, then the I/O adapter or endpoint may be configured to enable 3 VFs for native IOV and 1 VF for non-native IOV. In this way, the 3 VFs may each be directly mapped to a LPAR with the remaining VF being assigned to a virtual intermediary (VI), such as a virtual I/O server (VIOS), hypervisor, or the like. The VF that is associated with the VIOS may then require that all remaining LPARs be shared through the VIOS.

Thus, with the mechanisms of the illustrative embodiments, any number of LPARs and system images may share the same I/O adapter or endpoint. Some of the LPARs and system images may make use of native IOV based on the number of VFs supported by the I/O adapter or endpoint. The remaining LPARs and system images may still share the same I/O adapter or endpoint but must make use of non-native IOV supported by the same I/O adapter or endpoint. As a result, a system may make use of a smaller number of I/O adapters or endpoints.

Figure 12:
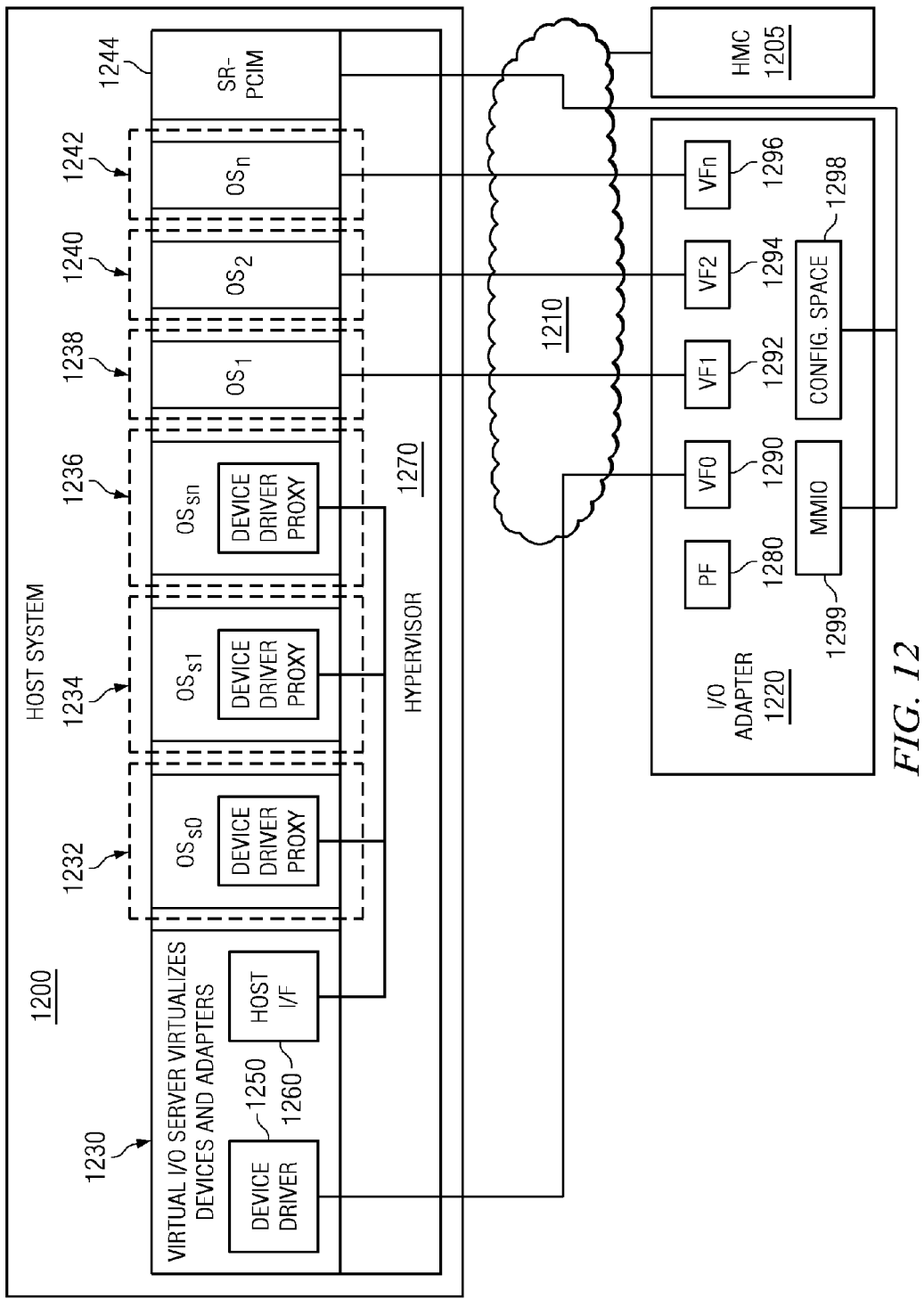
FIG. 12 is an exemplary diagram illustrating a system in which an I/O adapter/endpoint supports both native and non-native IOV in accordance with one illustrative embodiment.

FIG. 12 is an exemplary diagram illustrating a system in which an I/O adapter/endpoint supports both native and non-native IOV in accordance with one illustrative embodiment. As shown in FIG. 12, a host system 1200, also referred to as a root node herein, comprises a virtual intermediary (VI)

1230, which in the depicted example is a virtual I/O server 1230, that virtualizes devices and I/O adapters. Such virtualization by a virtual intermediary (VI) 1230 is generally known in the art and, for example, is used in the System p™ servers available from International Business Machines Corporation of Armonk, N.Y. As is generally known, such virtualization in the System p™ servers involves the use of Translation and Control Entry (TCE) tables for performing translations of addresses, redirection of DMAs, performing read-only and write-only control, and to support multiple I/O page sizes, among other functions.

In addition to the VIOS, a plurality of logical partitions (LPARs) 1232-1242 are provided, each running its own system image comprising an operating system (OS), device driver proxy 1252-1256, and any applications (not shown). Further, the host system 1200 has in one LPAR in which a single root PCI manager (SR-PCIM) 1244 is executed. The host system 1200 also executes a hypervisor 1270. The hypervisor 1270 may be software, firmware, or the like, that is used to support input/output virtualization (IOV) by intervening on, for example, one or more of configuration, I/O, and memory operations from a system image (SI) of a LPAR 1232-1242, and direct memory access (DMA), completion, and interrupt operations to a SI.

The SIs, e.g., the operating systems and their associated applications, drivers, etc., of the LPARs 1232-1242, along with the VIOS 1230 and the SR-PCIM 1244 may communicate with a IOV enabled I/O adapter 1220 via a communication fabric 1210, which in the depicted example is a PCIe fabric, although the present invention is not limited to PCIe and other communication protocols and standards may be utilized without departing from the spirit and scope of the present invention. As shown in FIG. 12, the I/O adapter 1220 comprises at least one physical function 1280 and a plurality of virtual functions. The virtual functions are used by the system images, such as system images 1232-1242, of host systems to perform I/O operations with the I/O adapter 1220 using the memory mapped I/O (MMIO) memory space 1299 in the I/O adapter 1220.

A configuration memory space 1298 is provided in the I/O adapter 1220 for storing the configuration information of the physical function (PF) 1280 and virtual functions (VFs) 1290-1296 of the I/O adapter. Both the MMIO memory space 1299 and configuration memory space 1298 may be accessed and modified by the SR-PCIM 1244 in order to perform proper configuration of the PF 1280 and VFs 1290-1296 in response to requests from a human user, automated mechanism, script, or the like, provided by the hardware management console (HMC) 1205, for example.

To illustrate the problem addressed by the present invention, assume that the number of virtual functions (VFs) 1290-1296 supported by the I/O adapter 1220, as determined from an initial configuration of the I/O adapter 1220 when the I/O adapter 1220 is added to the communication fabric 1210, is less than the number of LPARs 1232-1242 or system images implemented in the host system 1200. In a system utilizing native IOV on the I/O adapter, in which case the hypervisor does not interceded on every I/O operation between the LPARs 1232-1242 and the I/O adapter 1220, not all of the LPARs 1232-1242 or system images may share the I/O adapter 1220. This is because for native IOV in an I/O adapter 1220, there must be a one-to-one correspondence between the LPARs 1232-1242 and the number of VFs 1290-1296. Thus, if the host system implements 6 LPARs and system images, then the I/O adapter must support 6 VFs if all of the LPARs of the host system are to share the same I/O adapter. If there are not a sufficient number of VFs in the I/O adapter, an error may occur and/or additional I/O adapters must be provided or the number of LPARs and system images reduced.

The illustrative embodiments provide a solution to this problem by enabling both native IOV and non-native IOV in a single I/O adapter 1220. Native IOV is implemented with as many LPARs and system images as possible with any remaining LPARs and system images utilizing non-native IOV via the VIOS 1230 and the hypervisor 1270. As a result, even if the number of VFs 1290-1296 supported by the I/O adapter 1220 is not sufficient to provide native IOV to all of the LPARs 1232-1242 and system images of the host system 1200, the LPARs 1232-1242 and system images may still share the I/O adapter 1220 utilizing both native and non-native IOV as necessary.

In particular, in response to an event, such as the addition of the I/O adapter 1220 to the communication fabric 1210, the initialization of an additional LPAR or system image on the host system 1220, or the like, an administrator, automated mechanism, script, or the like, may send a communication to the SR-PCIM 1244 of the host system 1220, such as via the HMC 1205 and communication fabric 1210, to determine how many VFs 1290-1296 are supported by the I/O adapter 1220. The SR-PCIM 1244 either maintains this information in an associated data structure or interrogates the I/O adapter 1220 for the information and responds to the HMC 1205 with the number of VFs 1290-1296 supported by the I/O adapter 1220.

The user, automated mechanism, script, etc., then determines how many total LPARs 1232-1242 are to be implemented in the host system 1200 and determines how many VFs will be used for native IOV. The number of VFs used for native IOV may be specified by a user, set to a maximum value automatically, specified in a configuration file accessible by the HMC 1205, or any other manner of specifying the desired number of VFs for native IOV to implement the system. It should be appreciated that the maximum number of VFs 1290-1296 that may be used for native IOV is the total number of VFs supported by the I/O adapter 1220 less one, i.e. max=numVFs−1. This is because at least one VF is required to provide non-native IOV support in the I/O adapter 1220.

Based on the number of VFs determined to be configured for use in native IOV I/O operations, the user, automated mechanism, script, etc., may then assign particular LPARs 1238-1242 to the VFs that are configured for native IOV. In one illustrative embodiment, each of the LPARs 1232-1242 may have an associated priority value maintained in a data structure of the HMC 1205 or SR-PCIM 1244. This priority value may be assigned by a user, automatically determined based on characteristics of the particular LPAR, e.g., type of applications running in the LPAR and their relative importance to the host system 1200, arbitrarily assigned, or any other manner of assigning priority values. Based on such priority values, the LPARs 1232-1242 and their associated system images may be assigned to particular VFs 1290-1296 in a priority order. Thus, for example, a highest priority LPAR 1238 may be assigned to a first VF 1292, the next highest priority LPAR 1240 may be assigned to a second VF 1294, and a third priority LPAR 1242 may be assigned to a third VF 1296, and so on until all of the VFs configured for native IOV are associated with a particular LPAR in the host system 1200.

Once all of the VFs configured for native IOV are associated with an LPAR of the host system 1200, any remaining LPARs, e.g., LPARS 1232-1236, are associated with a shared VF, e.g., VF0 1290. The user, automated mechanism, script, etc. then instructs the SR-PCIM 1244 to configure the MMIO memory space 1299 of the I/O adapter 1220 so that the MMIO address space for the native IOV VFs 1292-1296 are accessible by their respectively assigned LPARs 1238-1242. This may be done, for example, by first assigning a PCI bus address range to the I/O device by writing its BAR. For VFs, that is done by writing one BAR which then determines that address range for the VFs. Once the BAR for the device is set up, the hypervisor may associate this bus address range with each LPAR by setting up the virtual address translation mechanism for each LPAR. This is done, for example, by writing the page translation entries in the virtual translation tables for the LPARs' virtual translation mechanism.

Once the MMIO space for native IOV VFs has been configured by the SR-PCIM 1244, the SR-PCIM 1244, either automatically or in response to a request from the HMC 1205, configures the MMIO space for the shared VF, e.g., VF0 1290. This may be done, for example, by assigning the MMIO space to the VIOS partition 1230 in a similar manner as the assigning the MMIO space of the other VFs 1292-1296 was done to the LPARs 1238-1242. In this way, the MMIO space may be accessed by the VIOS partition 1230 which may give the remaining LPARs 1232-1236 of the host system 1200 indirect access to that VF through the VIOS partition 1230.

Once these configurations of the MMIO memory space 1299 are performed, the SR-PCIM 1244 instructs the VIOS 1230 to create multiple communication queues, one for each LPAR 1232-1236 that is to use non-native IOV via the shared virtual function VF0 1290, and multiplex each communication queue into the shared virtual function VF0 1290. I/O communications between the LPARs 1232-1236 and the I/O adapter 1220 are performed via device driver proxies 1252-1256 of the LPARs 1232-1236 and a device driver 1250 of the VIOS 1230. That is, I/O communications from the LPARs 1232-1236 are sent via a device driver proxy 1252-1256 to a host interface 1260 of the VIOS 1230. The VIOS 1230 then forwards these I/O communications to the shared virtual function VF0 1290 of the I/O adapter 1220 via the device driver 1250. I/O communications from the I/O adapter 1220 are sent via the shared virtual function VF0 1290 to the device driver 1250 of the VIOS 1230 which forwards them to the appropriate LPAR 1232-1236 via the host interface 1260 and the corresponding device driver proxy 1252-1256. The VIOS 1230 handles the overhead operations for correlating I/O communications, received via the shared virtual function VF0 1290, with particular LPARs 1232-1236.

Thus, with the mechanisms of the illustrative embodiments, a single I/O adapter 1220 may be shared amongst a plurality of LPARs 1232-1242 even though the number of VFs 1290-1296 in the I/O adapter 1220 are not sufficient to enable native IOV for all of the LPARs 1232-1242 and their system images. With the mechanisms of the illustrative embodiments, a first set of VFs 1292-1296 of the I/O adapter 1220 are configured to provide native IOV support for a first set of LPARs 1238-1242 and their system images while a second set of VFs, which in the depicted example is a single VF 1290 but may in fact be more than one VF in other implementations, provides support for non-native IOV for a second set of LPARs 1232-1236 and their system images. Thus, a single I/O adapter 1220 supports both native and non-native IOV. A virtual intermediary, e.g., VIOS 1230, may be provided for handling the non-native IOV operations with the second set of VFs.

It should be appreciated that while the example shown in FIG. 12 shows a SR-PCIM 1244 being executed on the host system 1200, the various aspects of the illustrative embodiments described herein may also be implemented using a multiple-root PCI manager (MR-PCIM) executing in a LPAR of the host system 1200 without departing from the spirit and scope of the present invention. In addition, while the example shown in FIG. 12 has a particular number of LPARs, VFs, PFs, OS, device drivers, and other elements, it should be appreciated that many different modifications to the number, configuration, associations, and the like, of these elements may be made without departing from the spirit and scope of the present invention.

Figure 13:
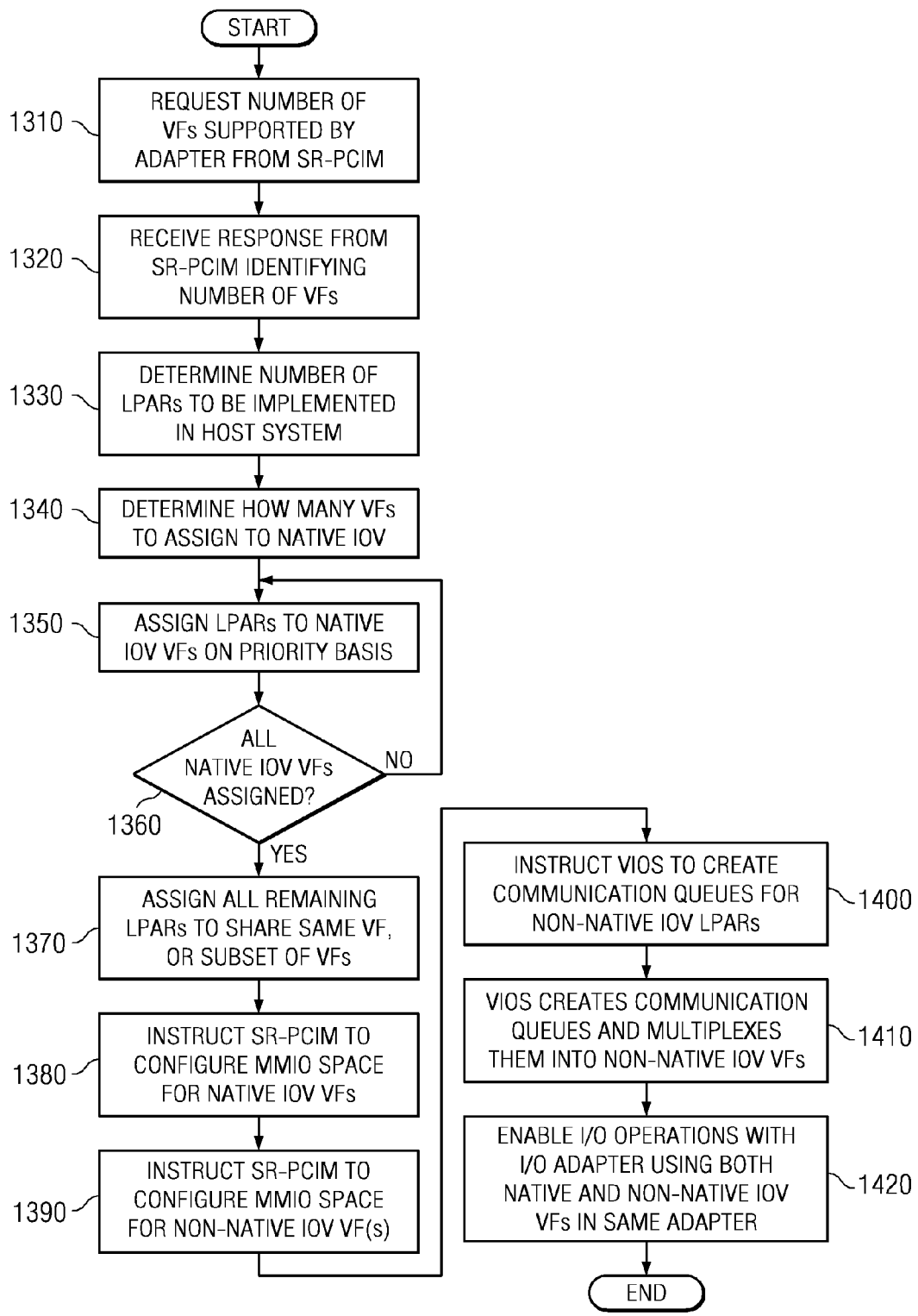
FIG. 13 is a flowchart outlining an exemplary operation of a PCI manager in configuring an I/O adapter/endpoint for both native and non-native IOV in accordance with one illustrative embodiment.

FIG. 13 is a flowchart outlining an exemplary operation of a PCI manager in configuring an I/O adapter/endpoint for both native and non-native IOV in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

As shown in FIG. 13, the operation starts with an administrator, which may be a human user, an automated mechanism, a script, or the like, requesting that the SR-PCIM identify the number of VFs supported by the I/O adapter (step 1310). The SR-PCIM responds to the administrator with the number of VFs supported by the I/O adapter (1320). The administrator specifies the number of logical partitions to be implemented in the host system (step 1330) and determines how many of the VFs are to be used for native IOV (step 1340). The administrator assigns priority LPARs, e.g., client OS partitions, to VFs that are to be used for native IOV (step 1350).

A determination is made as to whether all native IOV VFs have been assigned to a corresponding LPAR (step 1360). If not, the operation returns to step 1350 until all native IOV VFs have been assigned. If all native IOV VFs have been assigned, then the administrator assigns all other LPARs to share a same VF, or subset of VFs (step 1370). The SR-PCIM then configures the MMIO space for the native IOV VFs for access by their associated LPARs (step 1380). The SR-PCIM then configures the MMIO space for the non-native IOV VF(s) as shared by each of the remaining LPARs (step 1390).

The SR-PCIM instructs the VIOS to create communication queues for the LPARs sharing the shared VF(s) (step 1400). The VIOS creates the communication queues and associates them such that they are multiplexed with the shared VF(s) (step 1410). I/O operations with the I/O adapter using both the native and non-native IOV VFs is then enabled in the host system (step 1420) and the operation ends.

Thus, with the mechanisms of the illustrative embodiments, any number of LPARs and system images may share the same I/O adapter or endpoint. Some of the LPARs and system images may make use of native IOV based on the number of VFs supported by the I/O adapter or endpoint. The remaining LPARs and system images may still share the same I/O adapter or endpoint but must make use of non-native IOV supported by the same I/O adapter or endpoint. As a result, a system may make use of a smaller number of I/O adapters or endpoints and/or a larger number of LPARs than in known systems.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read-only memory (CD-ROM), compact disk—read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing input/output (I/O) operations between a host system and an I/O adapter, comprising:
    creating a plurality of virtual functions (VFs) in an I/O adapter of the data processing system;
    configuring at least one first VF to support non-native I/O virtualization (IOV) in the I/O adapter;
    configuring at least one second VF to support native IOV in the I/O adapter;
    performing I/O operations between a host system of the data processing system and the I/O adapter utilizing native IOV and the at least one second VF; and
    performing I/O operations between the host system and the I/O adapter utilizing non-native IOV and the at least one first VF, wherein logical partitions of the host system have associated priority values, and wherein logical partitions are assigned to the at least one first VF and the at least one second VF according to their associated priority values.

2. The method of claim 1, wherein configuring at least one first VF and configuring at least one second VF are performed in response to an event, wherein the event is one of an addition of the I/O adapter to a communication fabric or initialization of a logical partition (LPAR) or system image on the host system.

3. The method of claim 2, wherein, in response to the event, the method further comprises:
    determining a number of VFs that are supported by the I/O adapter;
    determining a total number of logical partitions are to be implemented in the host system; and
    configuring the at least one first VF and configuring the at least one second VF based on the determined number of supported VFs and total number of logical partitions to be implemented.

4. The method of claim 3, further comprising:
    determining a number of VFs to be used for native IOV based on the total number of logical partitions and the number of supported VFs; and
    configuring a remaining number of VFs to be used for non-native IOV.

5. The method of claim 4, wherein the number of VFs to be used for native IOV equals or is less than the total number of logical partitions to be implemented in the host system, and wherein the number of VFs to be used for non-native IOV is a difference between a number of VFs supported by the I/O adapter and a number of VFs to be used for native IOV.

6. The method of claim 5, wherein the number of VFs to be used for non-native IOV is at least one.

7. The method of claim 4, wherein the number of VFs to be used for native IOV is one of specified by a user, automatically set to a maximum number of VFs, or specified in a configuration file.

8. The method of claim 7, wherein the maximum number of VFs that may be used for native IOV is the number of VFs supported by the I/O adapter less one.

9. The method of claim 1, wherein the host system runs a plurality of logical partitions, each having their own system image, and wherein the system images use the VFs to perform I/O operations with the I/O adapter using a memory mapped I/O (MMIO) memory space in the I/O adapter.

10. The method of claim 9, wherein a configuration memory space is provided in the I/O adapter for storing configuration information of the VFs of the I/O adapter, and wherein the MMIO memory space and configuration memory space are accessed and modified by a configuration management unit to configure the at least one first VF and configure the at least one second VF.

11. The method of claim 1, further comprising:
assigning logical partitions of the host system to one of a first VF or a second VF, wherein logical partitions are first assigned to a second VF until each second VF is associated with a logical partition, and wherein remaining logical partitions are assigned to the at least one first VF.

12. The method of claim 11, wherein the remaining logical partitions share a single first VF.

13. A computer program product comprising a computer useable medium having a computer readable program stored thereon, wherein the computer readable program, when executed on a computing device, causes the computing device to:
create a plurality of virtual functions (VFs) in an I/O adapter of the data processing system;
configure at least one first VF to support non-native I/O virtualization (IOV) in the I/O adapter;
configure at least one second VF to support native IOV in the I/O adapter;
perform I/O operations between a host system of the data processing system and the I/O adapter utilizing native IOV and the at least one second VF; and
perform I/O operations between the host system and the I/O adapter utilizing non-native IOV and the at least one first VF, wherein logical partitions of the host system have associated priority values, and wherein logical partitions are assigned to the at least one first VF and the at least one second VF according to their associated priority values.

14. The computer program product of claim 13, wherein the computer readable program causes the computing device to configure at least one VF and configure at least one second VF in response to an event, wherein the event is one of an addition of the I/O adapter to a communication fabric or initialization of a logical partition (LPAR) or system image on the host system.

15. The computer program product of claim 14, wherein, in response to the event, the computer readable program further causes the computing device to:
determine a number of VFs that are supported by the I/O adapter;
determine a total number of logical partitions are to be implemented in the host system; and
configure the at least one first VF and configuring the at least one second VF based on the determined number of supported VFs and total number of logical partitions to be implemented.

16. The computer program product of claim 15, wherein the computer readable program further causes the computing device to:
determine a number of VFs to be used for native IOV based on the total number of logical partitions and the number of supported VFs; and
configure a remaining number of VFs to be used for non-native IOV.

17. The computer program product of claim 16, wherein the number of VFs to be used for native IOV equals or is less than the total number of logical partitions to be implemented in the host system, and wherein the number of VFs to be used for non-native IOV is a difference between a number of VFs supported by the I/O adapter and a number of VFs to be used for native IOV.

18. The computer program product of claim 17, wherein the number of VFs to be used for non-native IOV is at least one.

19. The computer program product of claim 13, wherein the host system runs a plurality of logical partitions, each having their own system image, and wherein the system images use the VFs to perform I/O operations with the I/O adapter using a memory mapped I/O (MMIO) memory space in the I/O adapter.

20. The computer program product of claim 19, wherein a configuration memory space is provided in the I/O adapter for storing configuration information of the VFs of the I/O adapter, and wherein the MMIO memory space and configuration memory space are accessed and modified by a configuration management unit to configure the at least one first VF and configure the at least one second VF.

21. The computer program product of claim 13, wherein the computer readable program further causes the computing device to:
assign logical partitions of the host system to one of a first VF or a second VF, wherein logical partitions are first assigned to a second VF until each second VF is associated with a logical partition, and wherein remaining logical partitions are assigned to the at least one first VF.

22. The computer program product of claim 21, wherein the remaining logical partitions share a single first VF.

23. A data processing system, comprising:
a host system; and
an input/output (I/O) adapter coupled to the host system, wherein the host system:
creates a plurality of virtual functions (VFs) in an I/O adapter of the data processing system;
configures at least one first VF to support non-native I/O virtualization (IOV) in the I/O adapter;
configures at least one second VF to support native IOV in the I/O adapter;
performs I/O operations between the host system and the I/O adapter utilizing native IOV and the at least one second VF; and
performs I/O operations between the host system and the I/O adapter utilizing non-native IOV and the at least one first VF, wherein logical partitions of the host system have associated priority values, and wherein logical partitions are assigned to the at least one first VF and the at least one second VF according to their associated priority values.

24. The method of claim 1, wherein logical partitions having relatively higher priority values are assigned to the at least one second VF until each of the at least one second VF is assigned to a corresponding one of the logical partitions, and wherein logical partitions having relatively lower priority values are assigned to the at least one first VF after assigning the logical partitions having relatively higher priority values are assigned to the at least one second VF.

25. The computer program product of claim 13, wherein logical partitions having relatively higher priority values are assigned to the at least one second VF until each of the at least one second VF is assigned to a corresponding one of the logical partitions, and wherein logical partitions having relatively lower priority values are assigned to the at least one first VF after assigning the logical partitions having relatively higher priority values are assigned to the at least one second VF.

* * * * *